Oct. 17, 1950 O. R. CARPENTER ET AL 2,525,862
ELECTRICAL RESISTANCE BUTT WELDING APPARATUS
Filed June 15, 1948 8 Sheets-Sheet 3

INVENTORS
Otis R. Carpenter,
BY George J. Hartnett, Jr.
& Reidar P.C. Rasmusen
JPMoran ATTORNEY Oct. 17, 1950     O. R. CARPENTER ET AL     2,525,862
ELECTRICAL RESISTANCE BUTT WELDING APPARATUS Filed June 15, 1948     8 Sheets-Sheet 4

INVENTORS
Otis R. Carpenter,
BY George J. Hartnett, Jr.
& Reidar P. C. Rasmusen
ATTORNEY

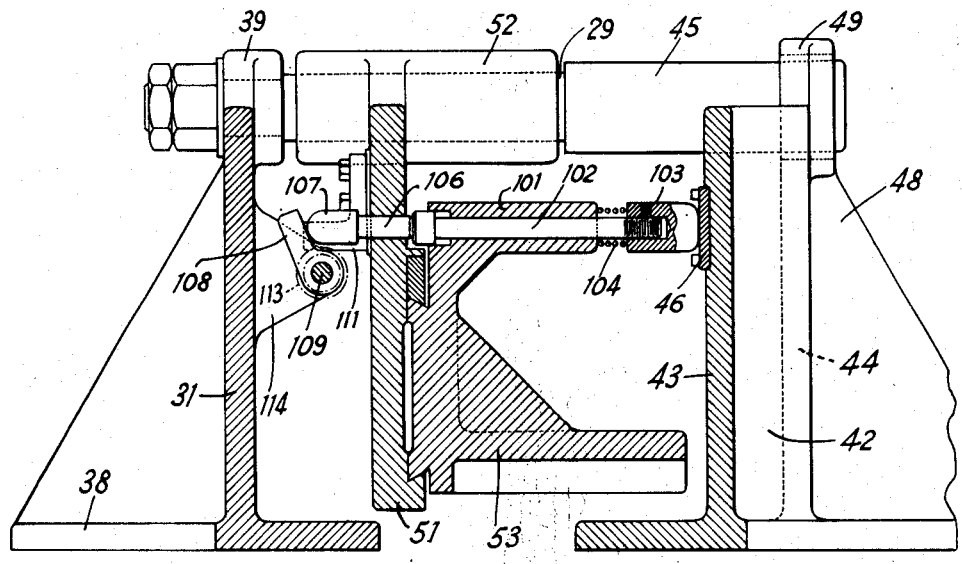
Fig. 12
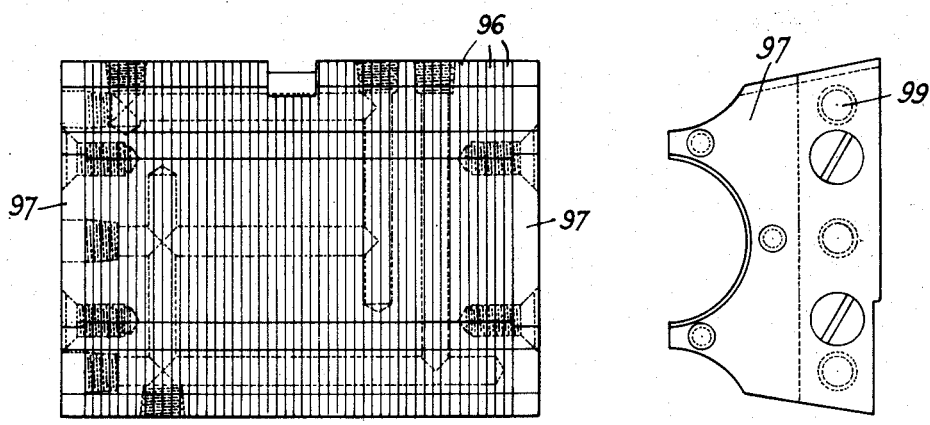
Fig. 13
Fig. 15
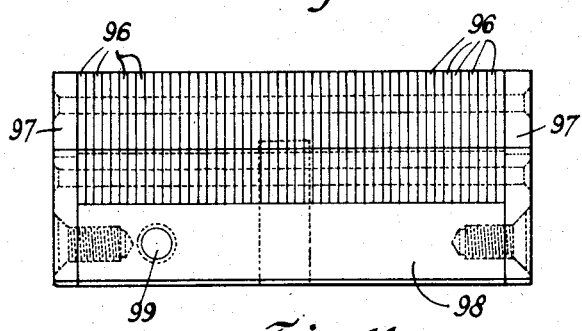
Fig. 14

Patented Oct. 17, 1950

2,525,862

UNITED STATES PATENT OFFICE 2,525,862

ELECTRICAL RESISTANCE BUTT WELDING APPARATUS

Otis R. Carpenter, Barberton, George J. Hartnett, Jr., Wadsworth, and Reidar P. C. Rasmusen, Akron, Ohio, assignors to The Babcock & Wilcox Company, Rockleigh, N. J., a corporation of New Jersey Application June 15, 1948, Serial No. 33,106

15 Claims. (Cl. 219—4)

1

This invention relates to electric butt welding apparatus, and more particularly to an improved butt welding apparatus of the type shown and described in Trainer Patent No. 2,276,354, issued March 17, 1942, for "Welding Method and Apparatus."

While the present apparatus is particularly adapted to perform the method of the Trainer patent, it has numerous improved features. In particular, control arrangements are provided whereby the present apparatus will automatically perform predetermined operational sequences in response to operation of a single control for each sequence.

In the method described in the Trainer patent, a pair of workpieces, such as tubes, are positioned in the apparatus and properly aligned by engagement with indexing means. The facing ends of the workpieces are then machined to a predetermined contour, after which these ends are abutted and electrically welded. The welded joint may be annealed if desired.

The present apparatus provides a much more compact arrangement of components, and a much more flexible control of the movements of the apparatus and of the pressure applied during welding. For this purpose, the apparatus includes a frame on which is supported a fixed head, receiving one of the workpieces, and a carriage movable longitudinally relative to the head and receiving the other work member. An indexing and machining ram is reciprocable transversally of the frame, and may be advanced to a position between the head and carriage. This ram is automatically moved longitudinally relative to the head at a rate of speed one-half that of the carriage speed, during indexing and machining sequences, so that the ram is automatically kept centered between the head and carriage. The ram carries indexing means, for properly positioning the workpieces in the apparatus, and milling cutters for machining the ends of the workpieces to a predetermined contour.

The head and the carriage each carry a pair of relatively movable, current conducting, welding dies operative to engage the workpieces near their facing ends. The workpieces are further rigidly held in position by two pairs of clamps, each mounted on the head or carriage. A feature of the invention is that one welding die of each pair is laterally fixed in position, so that accurate longitudinal alignment of the workpieces may be had at all times. Furthermore, the welding dies are of a novel construction insuring uniform

2 distribution of the welding current over the entire area of engagement of the workpieces. This uniform current distribution eliminates "hot spots" or burning of the dies and workpieces.

Movement of the carriage is effected by three separate operating mechanisms, thus giving flexibility of control during positioning of the carriage and during the welding sequence. During positioning, the carriage is moved at a relatively slow rate by means of a hydraulic cylinder arrangement. During the first pulse of a two pulse welding sequence, the carriage is operated by a low pressure air cylinder arrangement to force the workpieces together under relatively low pressure. During a "cool time" between the first and second pulses, and during the second weld pulse and subsequent "hold time," the carriage is operated by a high pressure air cylinder arrangement, which acts on the carriage through the piston rods of the low pressure cylinders. Selection of the low pressure and high pressure cylinder operation is effected automatically by controls associated with the apparatus.

A feature of the invention is the positioning of the welding transformer within the framework of the apparatus and substantially at the welding point so that short secondary leads may be used between the transformer and the welding dies. In electric resistance butt welding, a relatively heavy current surge is required, necessitating the use of a high capacity welding transformer. Such high capacity transformers are bulky and heavy, which has hitherto prevented their incorporation into the welding apparatus, and the transformers have generally been located outside the apparatus. The outside locations require the use of relatively long leads between the transformer secondary and the welding electrodes or dies. These long leads induce undesirable electric losses, and are otherwise disadvantageous.

In the present invention, these disadvantages are eliminated in a novel manner. Specifically, two transformers are provided, each being of substantially one-half the required capacity and thus being substantially only one-half as heavy and bulky as the single transformer previously thought necessary. One transformer is mounted on the frame beneath the fixed head with its secondary terminals substantially vertically aligned with the welding dies carried by the head. The other transformer is suspended from the movable carriage, for movement as a unit therewith, with its secondary terminals aligned with the welding dies on the carriage. Consequently, only very short leads are required between the respective secondary terminals and the welding dies. The respective primary and secondary windings of the two transformers are connected in parallel to provide the required heavy secondary current. As the carriage has only a few inches of movement relative to the head, only very short leads are required to connect the secondary sides of the two transformers and these leads are made flexible to allow for the carriage movement.

It is therefore one of the objects of this invention to provide an improved electric butt welding apparatus.

Another object is to provide such an apparatus in which positioning, welding and annealing sequences are effected automatically in response to operation of a single control for each sequence.

A further object is to provide such an apparatus having increased flexibility of control and of application of pressure to the workpieces during the welding.

Still another object of the invention is to provide an electric butt welding apparatus in which a pair of welding transformers are mounted within the framework of the apparatus in such a manner that only very short secondary leads are required between the transformer secondaries and the welding dies.

Yet another object of the invention is to provide an improved welding die assuring substantially uniform current distribution over its area of contact with the workpiece, to prevent burning of the die or the workpiece.

These and other objects, advantages and novel features of the invention will be apparent from the following description and accompanying drawings.

Figure 1:
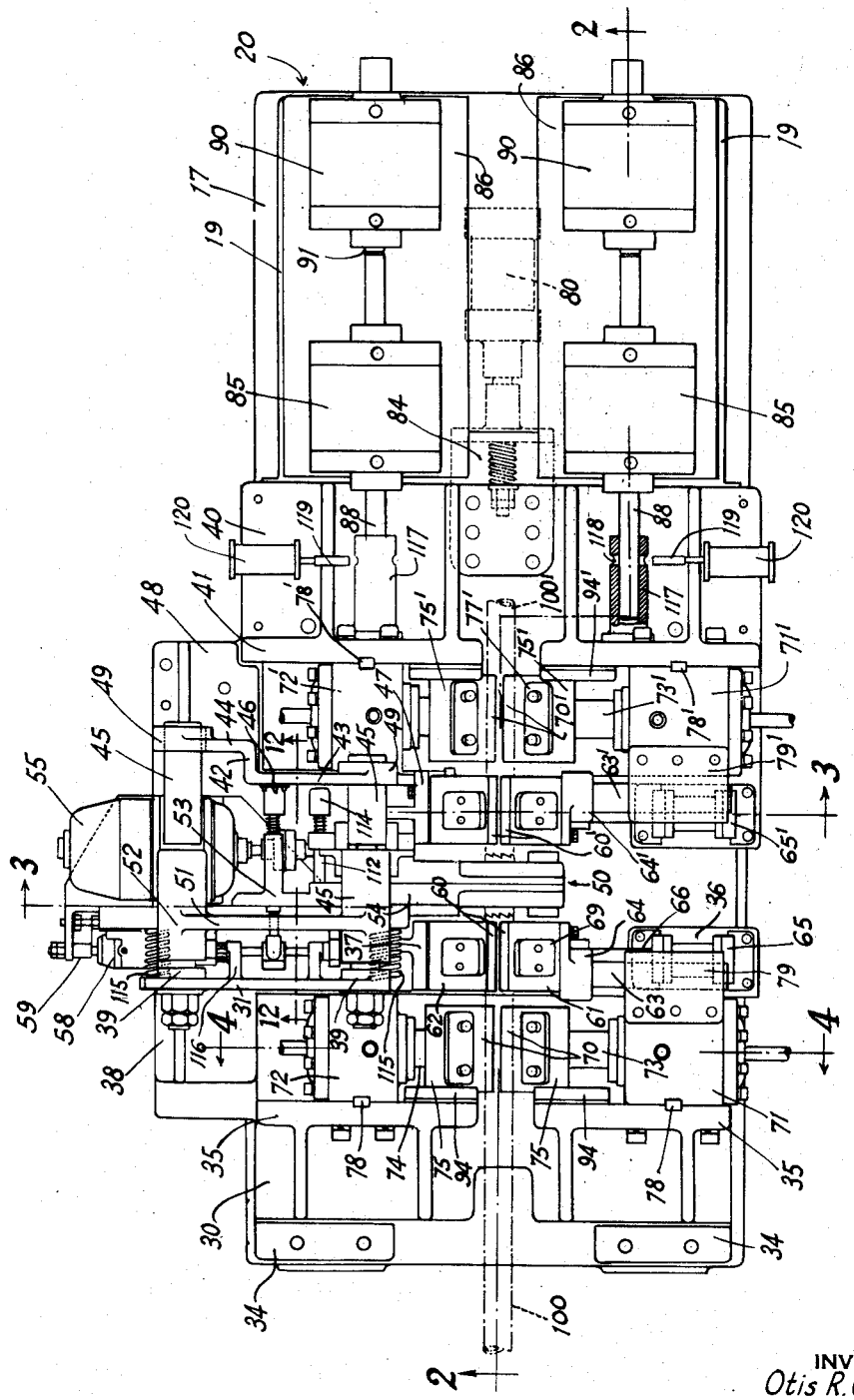
Fig. 1 is a plan view of electric butt welding apparatus embodying the principles of the invention.
Figure 3:
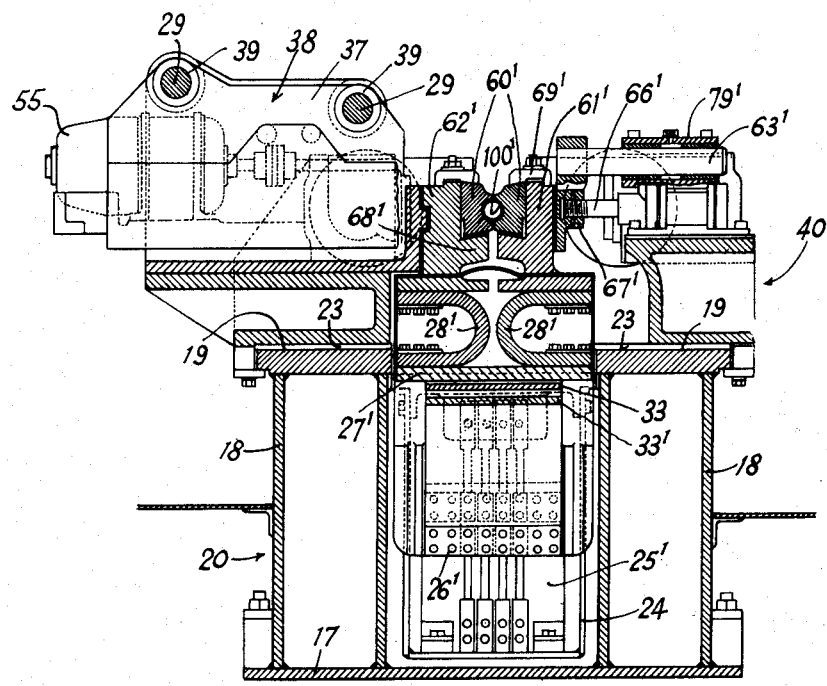
Figure 4:
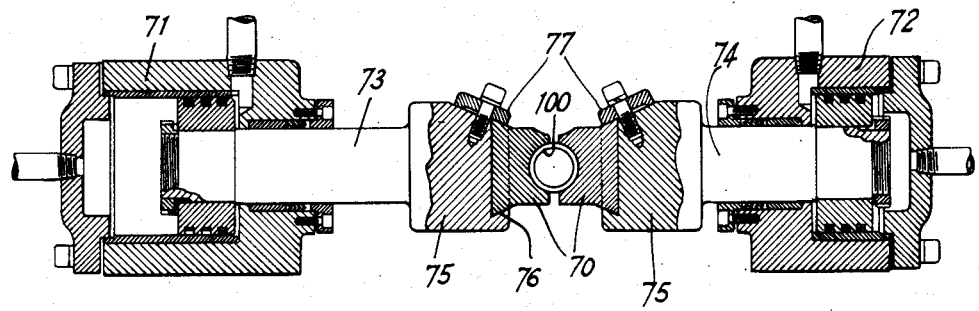
Figure 15A:
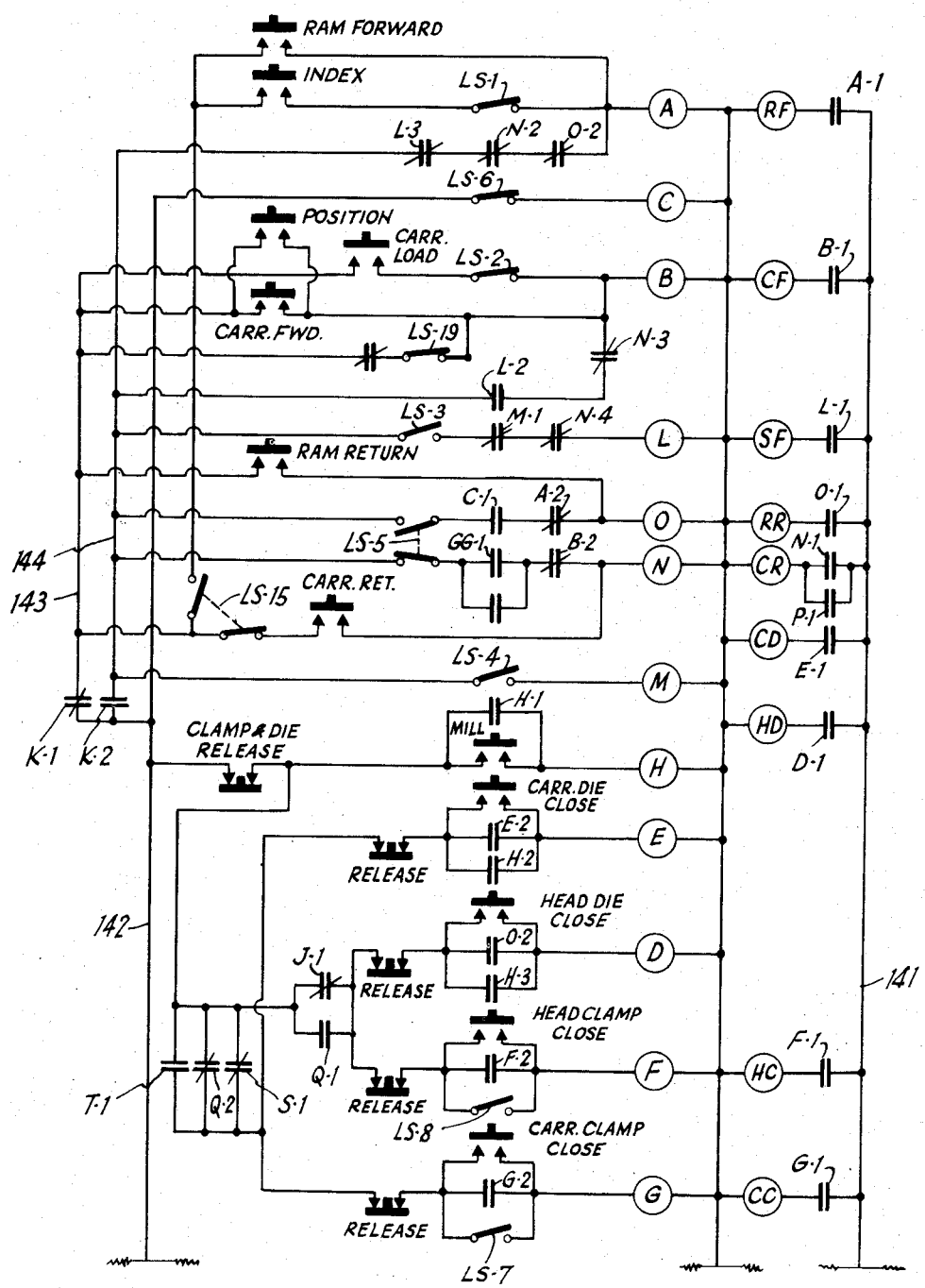
Figure 15B:
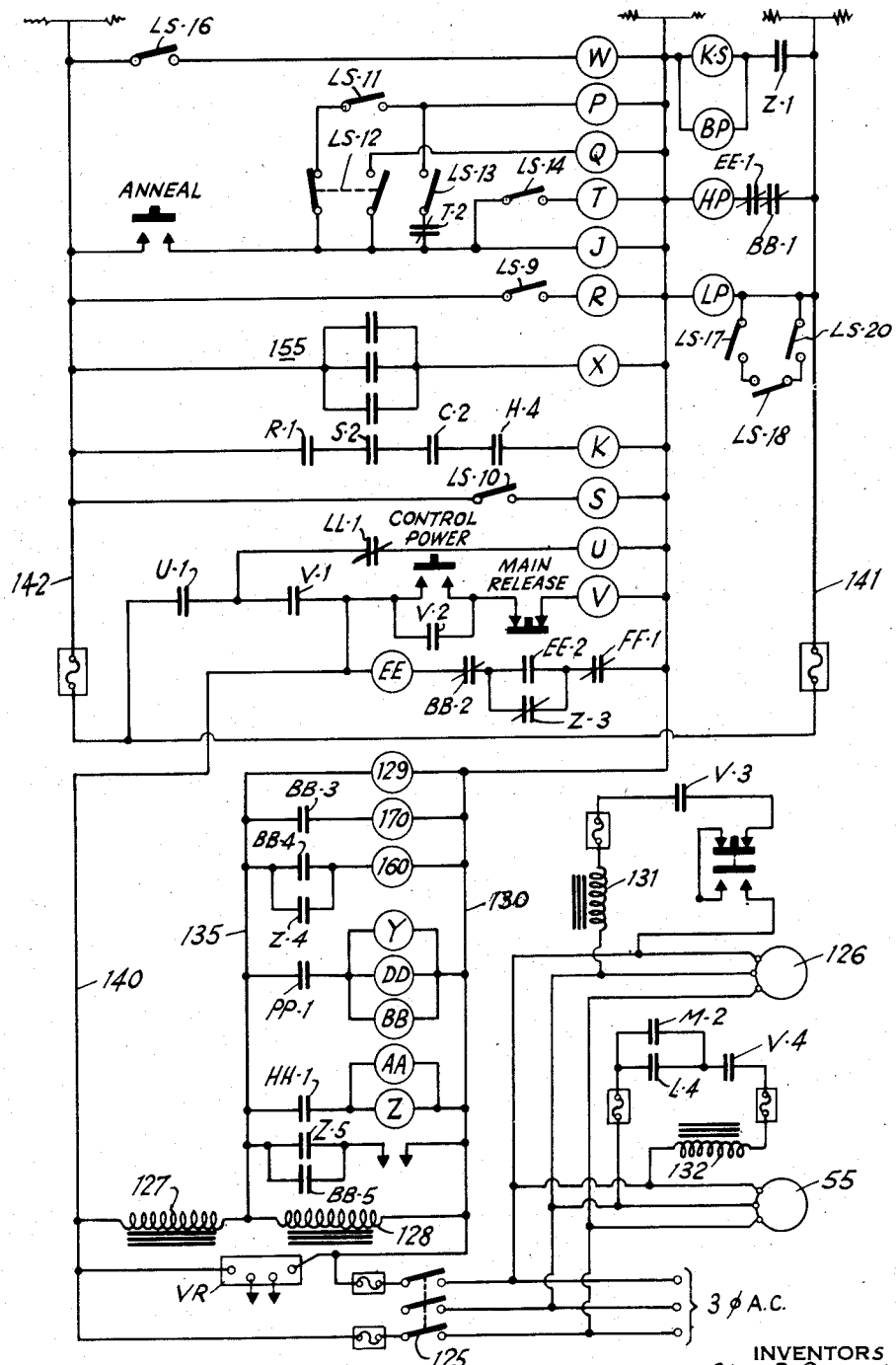
Figure 16:
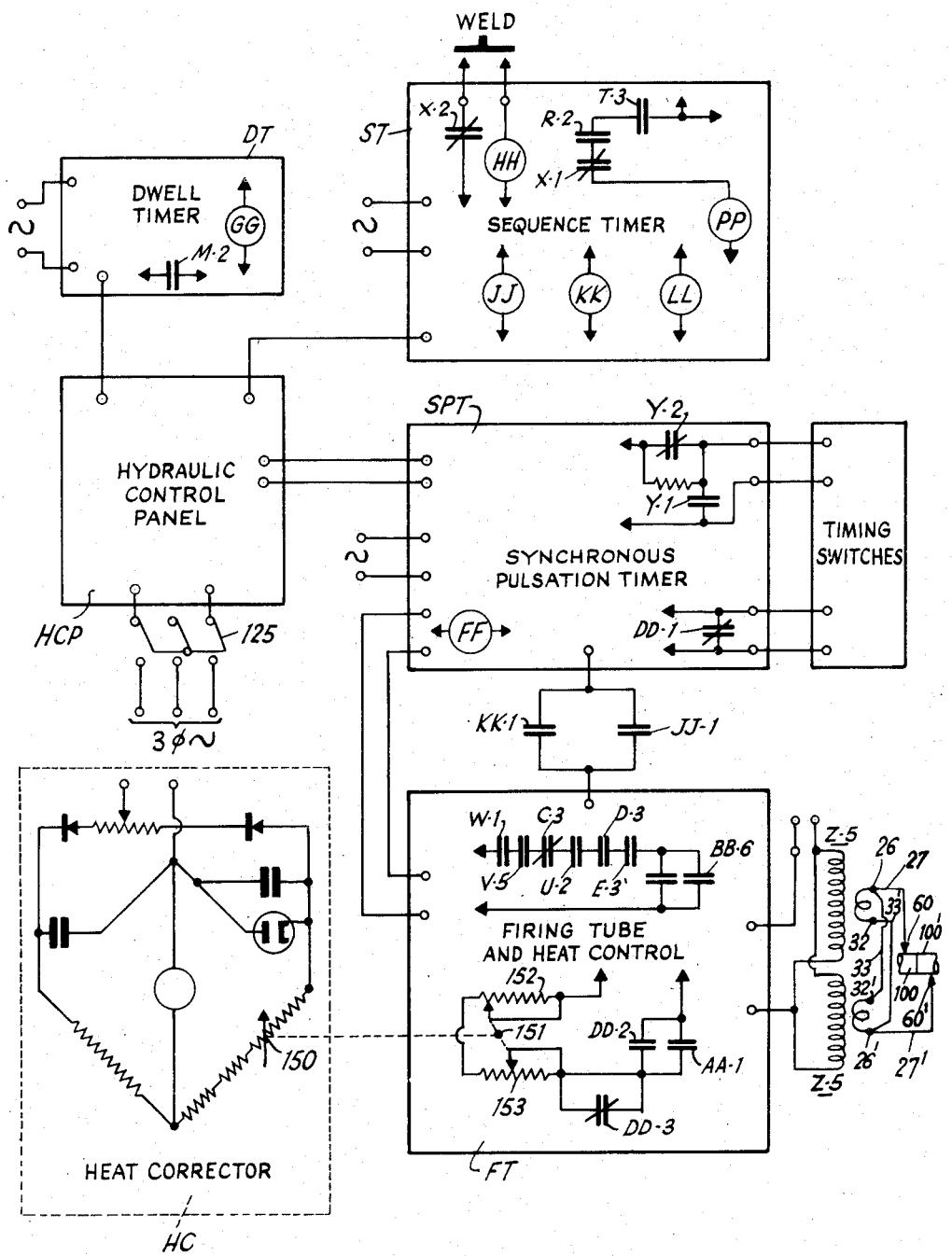

Figs. 3 and 4 are transverse vertical sectional views of apparatus, taken on the lines 3—3 and 4—4 of Fig. 1, looking in the direction of the arrows;

Figs. 5 through 11 are schematic plan views of portions of the apparatus, illustrating the sequence of operation thereof;

Fig. 12 is a vertical sectional view on the line 12—12 of Fig. 1;

Figs. 13, 14 and 15 are front elevation, plan and side elevation views respectively of a novel welding die forming part of the invention apparatus;

Figs. 15a and 15b, when vertically aligned, conjointly form a schematic wiring diagram of the electrical control circuits of the invention;

Fig. 16 is a schematic block diagram illustrating the interrelation of control elements used with the invention.

Figure 2:
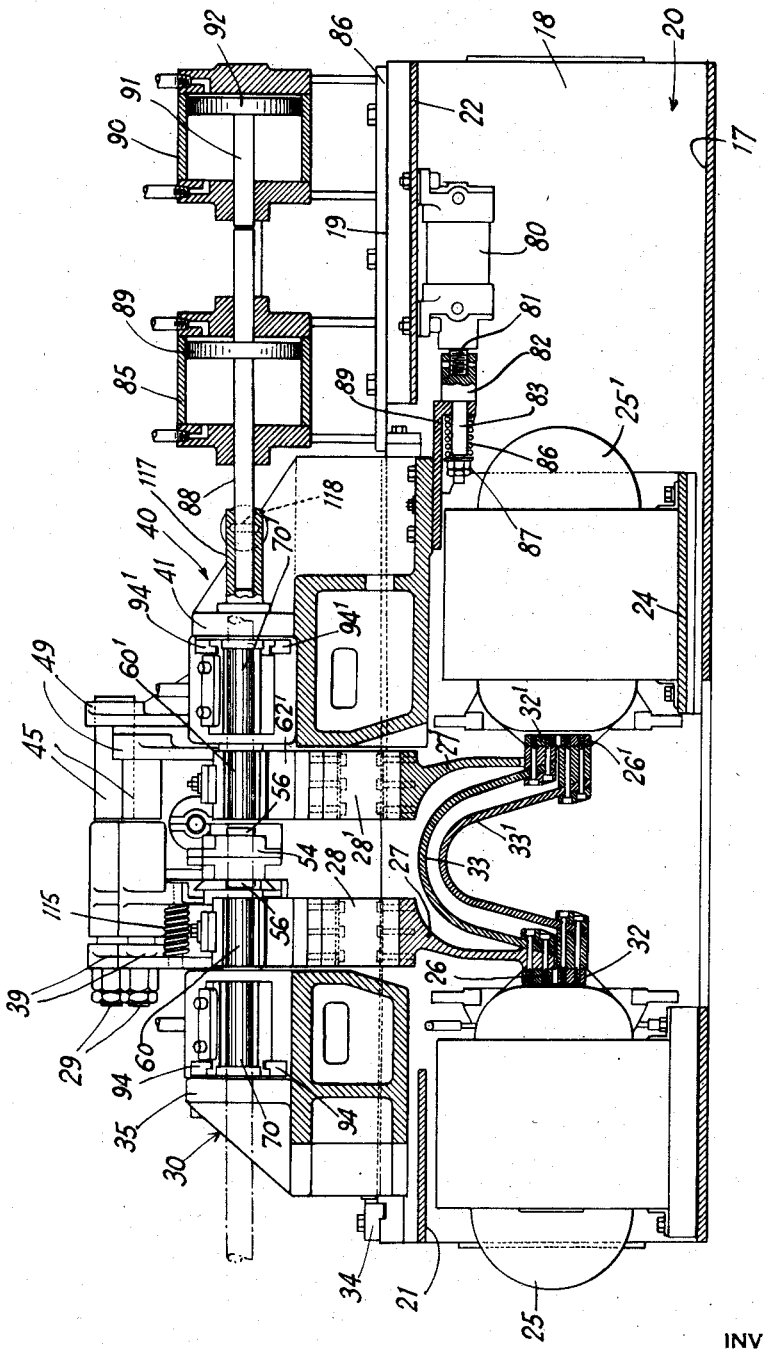
Fig. 2 is a longitudinal, vertical sectional view of the apparatus of Fig. 1, taken on the line 2—2 of Fig. 1 and looking in the direction of the arrows.

Referring to Figs. 1, 2 and 3, the invention as illustrated is applied to electric butt welding apparatus for butt welding tubes. For example, the apparatus may be used to weld unite tube sections for the manufacture of large flat tubular coils of the type shown and described in the above mentioned Trainer patent. While particularly adapted for practicing the method described and claimed in the Trainer patent, the apparatus of the present invention is not limited thereto, and furthermore may be used to weld unite elongated work members other than tubes. However, for purposes of illustration, the invention will be described as applied to the butt welding of tubes.

As shown in Figs. 1, 2 and 3, the apparatus includes a frame or bed 20 which supports a fixed head 30 and a carriage 40, which latter is longitudinally movable on frame or bed 20 toward and away from head 30. A ram 50 is mounted to move transversely of the direction of movement of carriage 40, and means are provided for automatically keeping ram 50 longitudinally centered between head 30 and carriage 40 during positioning movements of the latter. As will be explained, ram 50 carries indexing means 56 whereby work members, such as tubular sections 100, 100', may be properly positioned longitudinally in head 30 and carriage 40, respectively. The ram also carries milling cutters 57 which are arranged to engage the facing ends of the workpieces 100, 100' and machine a predetermined contour on these facing ends.

Workpiece 100 is held in position in head 30 by head welding dies 60 and head clamps 70. Similarly tube 100' is held in position on carriage 40 by carriage welding dies 60' and carriage clamps 70'. A novel feature of the arrangement is that the rearward welding dies 60 and 60' (Fig. 1) are fixed against lateral movement, thereby providing positive longitudinal alignment or centering means for the tubes 100, 100'. The welding dies 60 and 60' are of laminated construction to insure uniform distribution of the welding current, as will be described more fully hereinafter.

Carriage 40 is advanced and retracted relative to head 30 by three operating mechanisms. During the initial positioning of the tubes 100, 100', the machining of the facing ends thereof, and the annealing sequence, movement of carriage 40 is effected through the medium of a hydraulic cylinder and piston arrangement 80. This cylinder and piston arrangement provides a slow feed of carriage 40 toward fixed head 30. During the initial phase of the actual welding, the facing end of tube 100' is forced under pressure into engagement with the facing end of tube 100 by a pair of low-pressure cylinders 85. The welding operation takes place in two steps and, during the second step, the facing ends of the workpieces are forced together under high pressure by a pair of air cylinders 90 which operate on carriage 40 through the pistons and piston rods of low-pressure cylinders 85.

Frame 20 comprises a base 17 having transversely spaced, parallel pairs of inner and outer vertical plates 18, 18, each pair carrying a longitudinally extending horizontal, supporting plate 19 at its upper end. Near their left ends (Fig. 2), the center plates 18, 18 are joined by a horizontal plate 21 disposed a short distance below plates 19, 19, and a longer horizontal plate 22 interconnects the inner plates 18, 18 adjacent their right ends. Plate 22 is likewise below the level of plates 19, 19.

Fixed head 30 is supported on plates 19, 19 adjacent the left end of frame 20. Welding transformer 25 is disposed beneath head 30, and is supported on base 17 between inner plates 18. The intermediate portions of plates 19, 19 carry gibs or bearing plates 23, 23 slidably supporting carriage 40, and the carriage supports a dependent frame 24 located between inner plates 18 and carrying welding transformer 25'. At the right end of frame 20, each plate 19 supports a bracket 86 carrying one cylinder 85 and one cylinder 90. Plate 22 has cylinder 80 suspended therefrom.

The transverse spacing of plates 19, and the use of transversely spaced cylinders 85, 85 and 90, 90, provides adequate space for positioning of tubes 100, 100' in head 30 and carriage 40, respectively. The paired cylinders exert a laterally balanced thrust against carriage 40.

The arrangement of welding transformers 25, 25' constitutes a novel features of the invention. To provide the heavy current flow necessary for butt welding relatively heavy workpieces, a welding transformer of high capacity is required. The resultant large size of the transformer has heretofore prevented it being compactly incorporated in the welding apparatus, and the transformer has had to be located outside the apparatus. As a result, relatively long leads were required between the transformer secondary and the welding electrodes or dies. These long leads, with the heavy current flow therethrough, cause relatively heavy electrical losses, resulting in poor electrical efficiency.

In the present apparatus, short leads are used between the transformer primary windings and the welding dies, eliminating these losses and undesirable effects. This is accomplished by using two welding transformers 25, 25', each of which has substantially one-half the required rating. Consequently, each transformer is substantially one-half the weight of the single transformer hitherto used. As a result, the two transformers can be readily mounted in the apparatus in compact relation therewith.

In the invention apparatus, one transformer 25 is mounted in frame 20 beneath head 30, and the other transformer 25' is suspended from carriage 40 in hanger frame 24. The terminals of the two transformers project toward each other, and are constantly vertically aligned with the welding dies 60, 60 and 60', 60', respectively. Thus short leads are sufficient to connect the transformer secondaries to the welding dies.

Referring to Figs. 1, 2 and 3, one set of terminals 26 of the secondary winding of transformer 25 is connected to a relatively rigid bus bar 27, and the upper end of bus bar 27 is connected by a pair of U-shaped conductors 28 to the carriers 61, 62 for welding dies 60, 60. Similarly, one set of terminals 26' of the secondary winding of transformer 25' is connected to bus bar 27', and the upper end of bus bar 27' is connected by a pair of conductors 28' to the carriers 61', 62' for welding dies 60', 60'. Conductors 28, 28' are U-shaped to allow for transverse movement of the front dies 60, 60'. As both transformer 25' and welding dies 60', 60' move, as a unit, with carriage 40, dies 60', 60' are always in substantial vertical alignment with terminals 26'.

To provide the necessary heavy current flow for welding, the primary and secondary windings of transformers 25, 25' are connected in parallel. For this purpose, the other terminals 32 of the secondary winding of transformer 25 are connected to the terminals 26' of the secondary winding of transformer 25' by a wide, flat, flexible strap 33 of conductive material, such as copper or brass. A similar strap 33' connects the other terminals 32' of the secondary winding of transformer 25' to the terminals 26 of the secondary winding of transformer 25. Straps 33, 33' are bowed between their ends, to allow for relative movement of transformers 25, 25' during movement of carriage 40. Such movement is limited in practice to an amount of the order of seven inches (7"). Thus, a compact, efficient welding transformer arrangement is provided, in which extremely short leads are provided between the transformer secondary terminals and the welding dies.

Head 30 is held against outward movement on frame 20 by a pair of clamps 34. Intermediate its ends, head 30 has a pair of transversely spaced, vertical flanges 35, 35 to which are secured hydraulic cylinders 71, 72 having piston rods 73, 74, respectively. The forward ends of the piston rods are enlarged to form carriers 75, 75 for head clamps 70, 70, and each carrier has a recessed lip 76 supporting a clamp 70. A clamping plate or bar 77 secures each clamp 70 against lip 76. Referring to Fig. 4, it will be noted that the piston rod 74 of rearward cylinder 72 has a very short stroke, whereas piston rod 73 of forward cylinder 71 has a much longer stroke. The stroke of piston rod 74 is sufficient only to allow retraction of rear clamp 70 to a point providing vertical clearance for tube 100. Keys 78 effectively prevent movement of cylinders 71, 72 transversely of head 30. Guides 94, 94 on flange 35 serve as guiding supports for carriers 75, 75 during transverse movement of the latter.

Cylinder 71 carries a bracket 79 having a tubular guide passage receiving a guide rod 63. A bracket 64 on the forward end of rod 63 is secured to and supports the carrier 61 for forward head die 60. This head die is transversely reciprocated by means of a hydraulic cylinder 65 mounted on an elevated pad 36 of head 30. Cylinder 65 has a piston rod 66 with a bracket 67 on its forward end secured to carrier 61. Carrier 62 of rear head die 60 is secured to a vertical flange 37 of a bracket or support 38 mounted on the inner end of head 30. Both carriers 61, 62 have ledges 68 against which dies 60 are held by clamping bars 69.

Carriage 40 has, intermediate its ends, a pair of transversely spaced vertical flanges 41, 41 to which hydraulic cylinders 71', 72' are secured. These cylinders, their manner of mounting, and their connections to carriers 61', 62' of carriage clamps 70', 70' are identical to the corresponding cylinders 71, 72 on head 30. Consequently, the same numerals primed have been used to indicate identical elements, and detailed description is believed unnecessary. Likewise, forward carriage die 60' is supported and operated in the same manner as forward head die 60. The carrier 62' of fixed rear carriage die 60' is mounted on the flange 47 of a bracket 48 disposed inwardly of flange 41.

Ram 50 is supported for transverse and longitudinal movement in the following manner. Bracket 38 has a transversely extending vertical flange 31 carrying a pair of transversely spaced bosses 39. Similarly, bracket 48 has a corresponding vertical flange 42 having spaced bosses 49 aligned with bosses 39. Flange 42 is in two, longitudinally offset, sections 43, 44, and section 43 carries a wear plate 46 on its inner surface for a purpose to be described. Rods 29 have their ends secured in bosses 39 and extend into sleeves 45 slidably mounted in bosses 49.

A longitudinally movable slide 51 extending transversely of frame 20 between brackets 38 and 48 has a pair of elongated tubular guides 52 slidable on rods 29 between bosses 39 and sleeves 45. As seen in Fig. 12, slide 51 carries a slide 53 extending parallel to and slidable along slide 51. Slide 53 supports ram 50, which includes a motor 55 having an elongated, narrow gear housing 54 secured thereto. At its forward end, housing 54 carries a pair of oppositely facing positioning or indexing pads or abutments 56 and, rearwardly of pads 56, a pair of milling cutters 57 project from opposite sides of the gear housing. Slide 53 is transversely reciprocated by a hydraulic cylinder 58 mounted on slide 51 and having its piston rod 59 connected to slide 53.

Cutters 57 are driven by motor 55 through gearing in housing 54, and are adapted to machine a predetermined contour on the opposing ends of tubes 100, 100'. The particular contour depends on welding conditions, such as current time and pressure and upon the composition of the workpieces.

A feature of the invention is the means for keeping ram 50 centered between head 30 and carriage 40 during the indexing and machining sequences. This means comprises a pair of racks 111 on slide 51. These racks are engaged with a pair of pinions 113 on a shaft 109 rotatably mounted in trunnions 116 on flange 31. Shaft 109 has fixed thereto an arm 108 engaged by the head 107 of a plunger 106 slidable through slide 51. An arm 101 on slide 53 slidably supports a plunger 102 having a head 103 urged to the right (Fig. 12) by a spring 104. A similar spring biased plunger 112, with a head 114 is slidably mounted on slide 53 inwardly of plunger 102.

Arm 108 is longitudinally aligned with cam or wear plate 46. When ram 50 is in the "indexing" position and pads 56 are aligned with the tube ends, plunger 112 is aligned with plunger 106, and its head 114 engages cam 46. As carriage 40 moves toward head 30, plunger 112 forces plunger 106 to the left to rock arm 108. This turns shaft 109 and pinions 113 to pull racks 111 and slide 51 to the left. The size of pinions 113 is so selected that such movement of ram 50 is at one-half the speed of carriage 40. Similarly, when cutters 57 are aligned with the tube ends, plunger 102 is aligned with plunger 106, and its head 103 engages cam 46. Movement of carriage 40 to the left thus rocks shaft 109 and gears 113 to move ram 50 to the left at half speed, keeping the ram centered between head 30 and carriage 40. Ram 50 is biased to the right by a pair of coil springs 115.

The hydraulic cylinder 80 is used to move carriage 40 during the tube loading and tube machining operations, and also to maintain pressure on the welded joint during annealing. Cylinder 80 is suspended from plate 22 and has a piston rod 81 carrying an abutment 82. The latter has an extension 83 extending through an L-shaped bracket 84 on carriage 40. A coil spring 86 surrounds extension 83, and is held between bracket 84 and a nut 87 on extension 83. Cylinder 80 thus exerts a positive forward force on carriage 40, while not substantially obstructing movement of the carriage by cylinders 85 or 90.

Cylinders 85 have piston rods 88 extending both forwardly and rearwardly from the cylinders, being connected to pistons 89. At its forward end, each rod 88 is slidably received in a bushing 117 on flange 41, and each bushing has diametrically opposite slots 118 in its wall. Reciprocable through the slots 118 of each bushing is a flat locking bar 119 on the piston of a locking cylinder 120. Bars 119 normally are retracted so that rods 88 are disconnected from carriage 40.

When the carriage 40 has been moved to the welding position (Fig. 8) in which the tube ends are abutted, the ends of rods 88 are a slight distance rearwardly of slots 118. Cylinders 120 are activated to push bars 119 through slots 118. Low pressure air is now applied to cylinders 85, during the welding, to abut rods 88 against bars 119 forcing carriage 40 forward to upset the joint during the first welding pulse. At the beginning of the hold time, high pressure air is admitted to cylinders 90 to move pistons 92 to the left, abutting rods 91 against the rear ends of rods 88 to apply high pressure to the welded joint during the hold time and during the second welding pulse. The short stroke thus required of pistons 89 and 92 speeds up the operation of the machine, cuts down the volume of air required and insures full pressure at the time of the weld.

*The welding dies*

Welding dies 60, 60 and 60', 60' have a novel construction assuring substantially uniform current distribution. A typical welding die is shown in Figs. 12, 13 and 14 as formed of relatively thin laminations 96, preferably made from ⅛ inch strip. Laminations 96 are coated on both surfaces with an insulating compound, and are clamped between end plates 97 which are bolted to back plate 98. The compound structure is then machined and the forward face of the die is machined to proper size to fit a given diameter tube. Cooling fluid passages, generally indicated at 99, are bored in the die for connection to a cooling fluid circulation system.

The use of the surface insulated laminations 96 results in a substantially uniform current distribution over the full tube contacting surface of the die. Such equal current distribution eliminates burns on the die, thus greatly prolonging the life of the die. Furthermore, spot burning of the work is substantially eliminated.

*General operation of the apparatus*

The apparatus described so far has associated therewith automatic controls by means of which the apparatus may be made to follow automatically any one of several sequences of operation. For this purpose, the application of hydraulic and air pressure to the several operating cylinders is under the control of solenoid actuated valves which may be either of the open and close type or of the flow reversing type. These valves, for automatic operation of the apparatus, are controlled through the actuation of limit switches operated by the moving parts of the apparatus and of controllers in automatic timers which are associated with the apparatus to regulate the duration and intensity of the electric current during welding and annealing.

As will be described hereinafter, a control panel is provided for the apparatus, and carries control push buttons by means of which the automatic sequences are initiated. The movement of individual parts of the machine may also be effected under individual manual control, likewise by means of push buttons. Emergency releases are provided on the control panel so that the dies and clamps may be instantly released and withdrawn in case of emergency.

In a typical welding operation involving the butt welding of a pair of tubes, such as 100, 100', the apparatus is conditioned first to properly position the tubes on head 30 and carriage 40. After the tubes have been so positioned and held in place by operation of the welding dies and the clamps, the facing, spaced ends of the tubes are machined to a predetermined contour by the milling cutters 57 on ram 50. The ram is then withdrawn and the carriage 40 is advanced to engage the two tube ends. The latter are then welded together by a heavy flow of electric current across the ends, after which a light flow of current may be provided to anneal the tubes at the joint and for fixed distances on either side thereof.

The welding takes place in two pulses, between which the tubes are held under pressure. For example, in welding 2″ diameter tubes of class A (A. S. M. E. classification on carbon content) with a 0.165″ wall thickness, the first welding pulse may be 18 cycles of current. During this first pulse, the tubes are held under relatively low pressure through operation of cylinders 85.

At the end of the first pulse, high pressure cylinders 90 are activated to increase the pressure on the joint, and this pressure is maintained during a "cool time" or "hold time" of 1 cycle duration. A second pulse of 18 cycles is then applied to the joint, after which the welding current is interrupted while high pressure is maintained on the joint for a predetermined period.

The joint may be annealed, if found necessary or desirable. The annealing pulse is 5 cycles in duration, with pressure applied to the joint through cylinder 80. The current flow during annealing is fifty percent of the current flow during welding, with the latter being selected in accordance with the characteristics of the material being welded. After the annealing pulse, the joint is again held under pressure for a predetermined time up to about one minute. During this time, the welded joint may be cleaned with tongs or shaped if desired. At the end of the annealing hold time, all pressure is released and the apparatus is automatically restored to its initial condition ready to receive the next pair of tubes.

Figure 5:
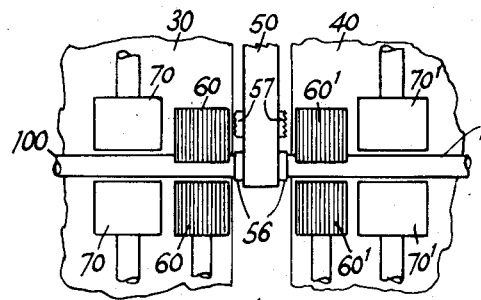

The sequence of operation will be better understood by brief reference to the schematic diagrams of Figs. 5 through 11. Referring to Fig. 5, the first operation of the machine is the indexing step in which ram 50 is advanced until indexing pads 56 are centered with respect to the welding dies and clamps. Tubes 100 and 100' are then placed on head 30 and carriage 40, respectively, the carriage 40 having been advanced to the indexing position by means of a "Position" control. The controls are then operated to clamp welding dies 60 and 60' on the tubes. As the welding dies reach their clamping position, they actuate limit switches which operate to effect movement of clamps 70 and 70' into tube clamping position.

Figure 6:
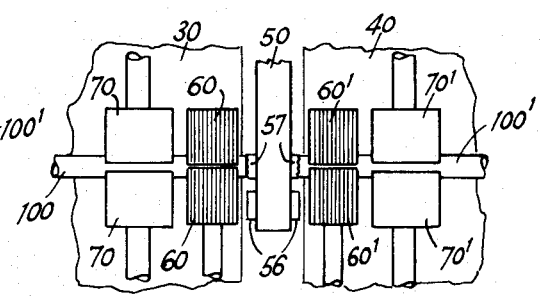
Figure 7:
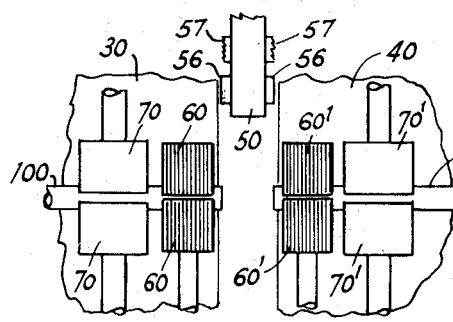

By pressing the "Mill" button on the control panel, the operator can initiate the automatic milling sequence. The steps of this sequence may, however, be effected under manual control. In the automatic sequence, ram 50 is advanced until cutters 57 are aligned with tubes 100, 100', as shown in Fig. 6, and motor 55 is energized to rotate the cutters. Carriage 40 is then advanced toward head 30 by hydraulic cylinder 80, and ram 50 is maintained centered between the head and carriage due to its movement at one-half the rate of the carriage movement. The cutters 57 are thus engaged with the ends of the tubes to machine surfaces of a predetermined contour thereon. After a given advance of carriage 40 toward head 30, a limit switch is actuated to stop the carriage advance and to activate a "Dwell Timer." This latter controls the motor 55 to rotate cutters 57 for a few revolutions to clean the ends of the tubes. After this time interval, ram 50 is automatically withdrawn, as shown in Fig. 7, and motor 55 is deenergized. The operator may then clean out any cuttings from the interior of the tubes 100 and 100'.

Figure 8:
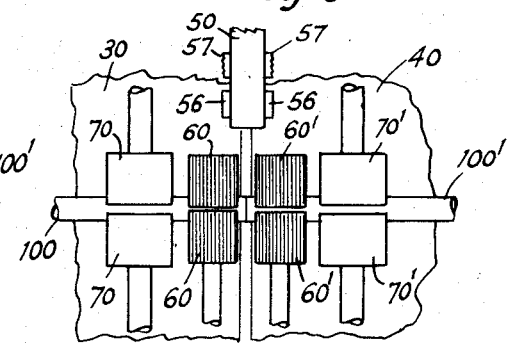

By operating the "Position" control, the operator then advances carriage 40 to abut the tube ends as shown in Fig. 8. By pressing the "Welding" button, the apparatus goes through the welding sequence previously described.

Figure 9:
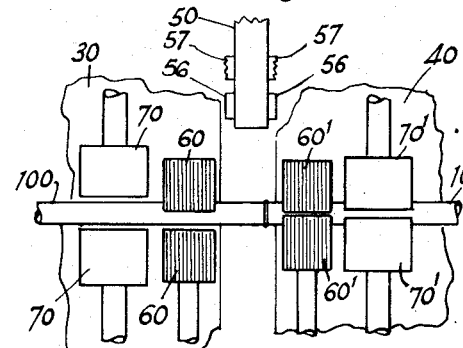
Figure 10:
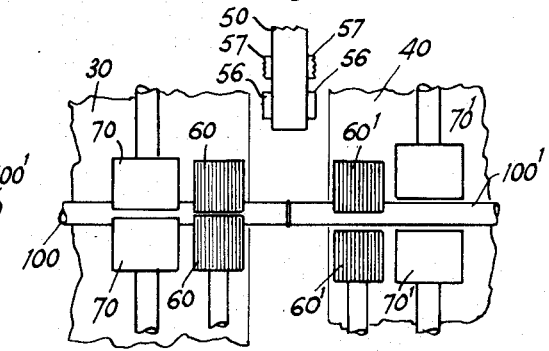
Figure 11:
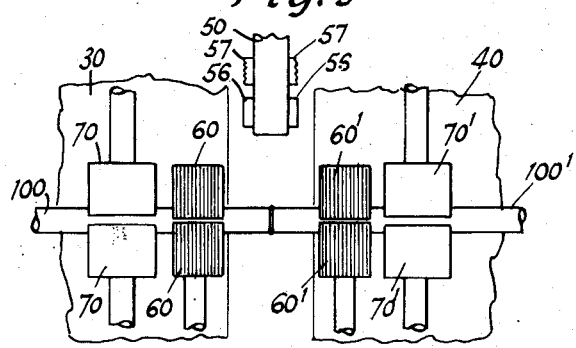

The initial movements of the apparatus in preparation for annealing are shown in Figs. 9, 10 and 11. The operator presses the "anneal" push button, and this initiates the automatic sequence of movement of the welding dies and clamps and of carriage 40. In the first step, the head dies 60 and head clamps 70 are released. Carriage 40 then retracts a predetermined amount, such as 2 inches, from the position shown in Fig. 8, pulling tube 100 through head 30 for this predetermined amount. The head dies and clamps are then reengaged with tube 100, and the carriage dies and clamps are released. Carriage 40 then retracts the same distance as before, as shown in Fig. 10. In this latter position, a limit switch automatically stops movement of the carriage and effects reengagement of the carriage dies and clamps with tube 100' as shown in Fig. 11. The welding dies are now spaced a considerable distance further apart than during the welding operation so that, during the annealing pulse, the current flows through a greater extent of the tubes on either side of the joint. After the welding clamps have closed, the previously described annealing sequence is automatically initiated.

Work loading and machining sequence

The electrical control system includes, as shown schematically in Fig. 16, a "Hydraulic Control Panel," HCP, carrying control push buttons and indicator lights, a "Heat Corrector," HC, which selects the proper current intensity and time values for various metal compositions of the workpieces, a "Dwell Timer," DT, a "Sequence Timer," ST, a "Synchronous Pulsation Timer," SPT, "Timing Switches," for the welding and annealing cycles, and a "Firing Tube and Heat Control," FT, which controls the duration of current flow to welding transformers 25, 25'. The functioning and cooperation of these units will become apparent from a description of the operation with particular reference to the "Hydraulic Control Panel" shown schematically in Figs. 15a and 15b.

Closure of a main power switch (not shown) applies 3-phase A. C. power to a control switch 125. When switch 125 is closed, power is applied to voltage regulator VR and to voltage dividing coils 127, 128. This applies line voltage between conductors 130 and 140, and substantially one-half of the line voltage between conductors 130 and 135. Power pilot light 129 on the control panel is illuminated to indicate "power on." At the same time, relay EE is picked up to open its normally closed contacts EE—1 and close a self holding circuit through its normally open contacts EE—2 and normally closed contacts BB—2 and FF—1. Contacts EE—1 break the energizing circuit for solenoid HP controlling application of pressure air to high pressure air cylinders 90, 90.

The operator now depresses the "Control Power" push button which picks up relay V through the normally closed "Main Release" push button. This latter is an emergency release which stops all functioning of the machine and restores all components to their released, inactive positions. Relay V closes its normally open contacts V—1, V—2, V—3 and V—4. Contacts V—1 close the pick up circuit for relay U through normally closed contacts LL—1 of relay LL in the "Sequence Timer," and contacts V—2 complete a holding circuit for relay V. Contacts V—3 energize the holding coil 131 of the magnetic starter for hydraulic pump motor 126, thus activating the hydraulic control system. Contacts V—4 close part of the circuit for the holding coil 132 of the magnetic starter for cutter motor 55 of ram 50, but this circuit remains opens through paralleled contacts L—4 and M—2, which are closed by movement of ram 50 to machining position, or advance of carriage 40 to the machining limit, respectively. Relay U closes contacts U—1 to connect conductor 140 to conductors 141 and 142, thus applying power to the relay and solenoid circuits. The apparatus is now ready for operation.

To load the apparatus, the operator depresses the "index" push button which picks up relay A through limit switch LS—1. Contacts A—1 close to energize solenoid valve RF to apply hydraulic fluid to cylinder 58 to move ram 50 forward. LS—15, the carriage return limit switch, is at this time in the position opposite to that shown. In other words, carriage 40 must be withdrawn before ram 50 can be moved forward under manual control. Contacts A—2 open to break the circuit for relay O controlling ram return solenoid valve RR. Ram 50 moves forward, closing ram return limit switch LS—6 to energize relay C, until indexing pads 59 are aligned with the tubes as shown in Fig. 5. At this point the ram opens limit switch LS—1 to drop relay A and close solenoid valve RF. Contacts A—2 have meanwhile held open the circuit for relay O controlling ram return solenoid valve RR.

The "Carriage Load" push button is now depressed, picking up relay B to energize solenoid valve CF through contacts B—1. This applies hydraulic pressure to cylinder 80 to move carriage 40 forward until the carriage opens limit switch LS—2 when it is in the "Load" position. Manually controlled forward movement of carriage 40 can be effected also by the parallel connected "Position" and "Carriage Forward" push buttons. Tubes 100 and 100' are now placed in the apparatus, with dies 60, 60 and 60', 60' and clamps 70, 70 and 70', 70' open.

Automatic operation is initiated by depressing the "Mill" push button to pick up relay H to close its holding contacts H—1. Contacts H—2 close to pick up relay E to operate solenoid valve CD to activate cylinder 65' to move forward carriage die 60' toward its laterally fixed mating die 60'. When the forward die 60' is fully closed on tube 100', it closes switch LS—7 to pick up relay G to operate solenoid valve CC through contacts G—1 and close carriage clamps 70', 70' on tube 100'. Similarly, contacts H—3 pick up relay D to operate valve HD to activate cylinder 65 to move laterally movable head die 60 toward laterally fixed head die 60. When the movable head die engages tube 100, it closes switch LS—8 to pick up relay F and operate solenoid valve HC through contacts F—1 to activate cylinders 71, 72 to close the carriage clamps on tube 100.

It should be noted that the two sets of dies and the two sets of clamps may be individually operated through the correspondingly labeled push buttons connected in shunt with contacts H—2, H—3 and switches LS—7, LS—8. Also, as each relay E, D, F, G picks up, it closes its own holding circuit. These holding circuits may be individually broken by the individual series connected "Release" push buttons, or all may be broken through depression of the "Clamp and Die Release" push button.

As the carriage and head clamps close, they close limit switches LS—9 and LS—10 to pick up relays R and S, respectively, to close contacts R—1 and S—2 in the pick up circuit of relay K. Contacts C—2 and H—4 have previously been closed through pick up of relays C and H. As relay K picks up, it opens contacts K—1 and closes contacts K—2. Contacts K—1 break the previously energized manual carriage and ram positioning circuits through conductor 143 and contacts K—2 energize conductor 144. The ram forward solenoid valve RF is energized through contacts A—1 when relay A picks up through normally closed contacts L—3, N—2 and O—2. Ram 50 moves forwardly until milling cutters 57 are opposite the tube ends, at which time the ram closes switch LS—3 to pick up relay L through contacts M—1 and N—4. Contacts L—3 open to drop relay A and close valve RF. Contacts L—4 complete the circuit for the holding coil 132 of the starter of cutter motor 55, thus energizing this motor. Contacts L—1 close the circuit for slow feed valve SF, and contacts L—2 close the circuit for relay B which opens valve CF through contacts B—1.

Valves SF and CF apply hydraulic pressure to cylinder 80, moving carriage 40 forward and thus moving ram 50 toward head 30 at one-half the speed of carriage 40. The tube ends are engaged with cutters 57 to have a predetermined contour machined thereon. The forward movement of carriage 40 continues until, after a predetermined machining of the tube ends, carriage 40 closes switch LS—4 to pick up relay M. This opens contacts M—1 to drop relay L to deenergize valve SF and stop forward movement of carriage 40. Contacts M—2 maintain motor starter holding coil 132 energized. The ram 50 does not move forward again as contacts C—1 and A—2 are closed, picking up relay O to open contacts O—2, breaking the circuit for relay A. Also, contacts O—1 are closed.

Contacts M—2 activate the "Dwell Timer" during a predetermined period while cutters 57 continue to rotate. This period is sufficient to allow for two revolutions of cutters 57. After such interval, relay GG in the "Dwell Timer" picks up to close contacts GG—1 to pick up relay N, which closes its holding circuit through contacts N—5. Contacts N—1 close to energize carriage return solenoid valve CR to activate cylinder 80 to withdraw carriage 40 and, at its limit of return movement, carriage 40 reverses limit switch LS—5 to drop relay N and pick up relay O. As the carriage withdraws, switch LS—4 opens to drop relay N and stop motor 55 by opening contacts M—2. Ram return valve RR opens, and ram 50 is withdrawn by cylinder 58. As the ram reaches its return limit, it opens switch LS—6 dropping relay C to drop relay O through contacts C—1 and close valve RR. Contacts C—2 open to drop relay K, closing contacts K—1 to energize conductor 143 and opening contacts K—2 to disconnect conductor 144. The apparatus is now ready for weld uniting the opposing faces of the tubes 100, 100'.

The welding sequence

To begin the welding, the "Position" push button is depressed, closing relay B to operate valve CF to advance carriage 40 until the tube ends abut. The "Heat Corrector" HC is set at the proper values for the material being welded through adjustment of variable resistor 150 which is ganged with the ganged taps 151 of resistors 152, 153 in the "Firing Tube and Heat Control" FT. Welding is initiated by depressing the "Weld" push button.

In order for the "Weld" push button to be effective, contact X—2 must be closed, which is the case when relay X is dropped. Relay X is controlled by a plurality of normally open contacts 155 which are associated with holding or lock out coils of other butt welders. When any butt welder is on the line, the other butt welders are locked out. This prevents an undue load on the line, which might result in poor voltage regulation and consequently poor welds. Thus, if another butt welder is on the line, one contact 155 is closed, picking up relay X to open contacts X—1 and X—2. Similarly, during welding or annealing, relays Z or BB are picked up to close the circuit to the holding coils of other butt welders and lock these out.

If contacts X—2 are closed, relay HH is energized, closing contacts HH—1, and picking up relays Z and AA. Contacts Z—1 close to open solenoid valve KS, energizing cylinders 120 to advance bars 119 through slots 118. As the bars advance to their limit, they close switches LS—17 and LS—18, with switch LS—20 being closed when carriage 40 is in the proper welding position. Valve LP is opened to apply low pressure air to cylinders 85 during the first welding pulse.

Contacts Z—3 open but relay EE remains up through contacts EE—2. Contacts Z—4 close the circuit of water valve 160 to circulate water through dies 60, 60 and 60', 60'. Contacts Z—5 close the lock out circuit for other butt welders. Contacts AA—1 cut resistors 153, 154 and 156 into the heat control circuit, with resistor 156 being shunted by contacts DD—3.

Relay HH initiates the timing action of the "Sequence Timer" ST, and, after a predetermined number of cycles, time delay relay JJ picks up, starting the "Synchronous Pulsation Timer" SPT through contacts JJ—1. The timer SPT starts a flow of current through welding transformers 25, 25' for a number of cycles determined by the setting of the weld "Timing Switches." These latter are connected to timer SPT through the contacts Y—2 of dropped relay Y, whereas the anneal "Timing Switches" are shunted by contacts DD—1 of dropped relay DD.

After the first welding pulse, relay FF is momentarily picked up to open contacts FF—1, dropping relay EE. Contacts EE—1 close, and high-pressure air is supplied to cylinders 90, 90 through valve HP. Another timing sequence of the "Sequence Timer" ST determines the "hold" or "squeeze" time, in which the weld is held under high-pressure without flow of welding current. A second pulse of a predetermined number of cycles of welding current is then initiated, with the weld under high-pressure, and is followed by a second "hold" time of a predetermined number of cycles. Relay HH is then dropped, dropping relays AA and Z, to terminate the welding operations. As relay Z drops, contact Z—1 reverses solenoid valve KS to effect withdrawal of bars 119 from slots 118, disconnecting cylinders 85 from carriage 40.

Annealing sequence

When the "Anneal" push button is operated, it picks up relay J, which releases the head dies 60, 60 and head clamps 70, 70 through opening of contacts J—1, as seen in Fig. 7. When the head clamps are fully open, limit switch LS—11 is closed, picking up relay P. This energizes carriage return valve CR through contacts P—1. Carriage 40 moves back, pulling weld-united tubes 100, 100' from head 20 until the carriage has withdrawn two inches, for example, from the welding position. At this point, the carriage reverses switch LS—12, dropping relay P and stopping the carriage, and picking up relay Q. Contacts Q—1 close to re-close the head dies and clamps. The head clamps, when closed, close switch LS—10 to pick up relay S, opening contacts S—1. As contacts Q—2 are open, the carriage clamps and dies are released as in Fig. 10. In their open position the carriage clamps close limit switch LS—13, again picking up relay P to open valve CR to withdraw the carriage.

After an additional movement of two inches, for example, the carriage closes switch LS—14 to pick up relay T. Contacts T—2 open, dropping relay P, and contacts T—1 close to reclose the carriage dies and clamps, as in Fig. 11. As the carriage clamps close, switch LS—9 is closed, picking up relay R. Contacts R—2 and T—3 (Fig. 16) are thus closed to initiate the annual pulses, provided contacts X—1 remain closed through picking up relay PP which closes its contacts PP—1 (Fig. 15B).

Closure of contacts PP—1 picks up relays Y, BB and DD. Contacts Y—2 open and contacts Y—1 (in timer SPT) close to shunt the weld timing switches, and contacts DD—1 open to remove the shunt from the anneal timing switches and cut them into the circuits of timer SPT. Contacts BB—1 open to close valve HP, cutting off high-pressure air from cylinders 90, 90. Contacts BB—2 open to break the circuit of relay EE. Contacts BB—3 and BB—4 close the circuits of oil pilot light 170 and water valve 160, respectively, while contacts BB—5 energize the control circuit to the cut out coils of other butt welders.

Also, contacts DD—2 (closed) and DD—3 (open) cut resistors 152, 153 and 156 into the circuit of FT. Contacts BB—6 close a circuit including series connected contacts W—1, V—3, C—3, U—2, D—3 and E—3, all of which are closed when the components of the apparatus are in proper position for annealing of the welded joint between tubes 100 and 100'.

Pick up of relay PP starts the anneal sequence of timer ST, and after an interval, relay KK is picked up to close KK—1 starting the timer SPT. This initiates current flow, along the length of the tubes between dies 60, 60 and 60', 60', for a predetermined number of cycles, with the joint under pressure through the action of cylinder 80. At the end of the annealing pulse, current flow is discontinued but pressure is applied to the tubes 100, 100' for a predetermined number of cycles, at the end of which relay LL is picked up. This opens contacts LL—1, dropping relay U and opening contacts U—1 to disconnect conductor 142 from conductor 140. Consequently, control power is removed from conductors 143 and 144 to restore all the control relays to their dropped, inactive position, readying the apparatus for another welding operation.

The described apparatus thus provides a novel, efficient and compact arrangement of parts assuring uniformly satisfactory welded joints. Among the novel features of the invention is the division of the required welding transformer capacity between two parallel connected transformers, one of which is mounted beneath the fixed head and the other of which is carried by the movable carriage. This feature permits the use of very short leads between the welding dies and the transformer secondary terminals.

A further novel feature is the construction of the welding dies, which are formed from laminations insulated from each other. This construction assures uniform distribution of the welding current over the area of contact between the die and the work, in turn preventing burning or hot spots on the work or the welding die.

The apparatus is extremely flexible in operation, as the individual functions and movement of individual parts may be effected manually without reference to each other. However, automatic controls are provided whereby the apparatus will go through predetermined sequences of operation upon the actuation of a single control for each sequence. A feature of the welding sequence is the use of a relay automatically operated at the end of the first welding pulse to effect the application of high-pressure to the workpieces at the joint. Emergency releases are provided so that all components are released and withdrawn in case of accident or emergency.

While a specific embodiment of the invention has been shown and described in detail to illustrate the application of the principles thereof, it will be understood that the invention may be otherwise embodied without departing from the principles.

We claim:

1. In butt welding apparatus, a fixed clamping means and a movable clamping means cooperable to maintain a pair of metal workpieces in longitudinal alignment during machining of the facing ends to welding contours and during subsequent welding of the workpieces at the machined surfaces; a machining head; means operable to position said head between the facing ends of the workpieces; mechanism operable to advance said movable clamping means toward said fixed clamping means to engage the end of one workpiece with said machining head; cooperating means, fixed relatively to said fixed clamping means, said movable clamping means and said machining head, operable upon such advance of said movable clamping means to engage said machining head with the end of the other workpiece; said cooperating means maintaining said head centered between said clamping means; said head positioning means being operative reversely to withdraw said machining head from between such facing ends to provide for juxtaposition of the latter for welding; and means operable by said machining head, in the withdrawn position, to condition said clamping means for movement toward each other to abut the facing ends of the workpieces.

2. In butt welding apparatus, a fixed clamping means and a movable clamping means cooperable to maintain a pair of metal workpieces in longitudinal alignment during machining of the facing ends to welding contours and during subsequent welding of the workpieces at the machined surfaces; a machining head; means operable to position said head between the facing ends of the workpieces; mechanism operable to advance said movable clamping means toward said fixed clamping means to engage the end of one workpiece with said machining head; cooperating means, fixed relatively to said fixed clamping means, said movable clamping means and said machining head, operable upon such advance of said movable clamping means to engage said machining head with the end of the other workpiece; said cooperating means advancing said machining head toward said fixed clamping means at one-half the rate of advance of said movable clamping means to maintain said head centered between said clamping means; said head positioning means being operative reversely to withdraw said machining head from between such facing ends to provide for juxtaposition of the latter for welding; and means operable by said machining head, in the withdrawn position, to condition said clamping means for movement toward each other to abut the facing ends of the workpieces.

3. In butt welding apparatus, a fixed clamping means and a movable clamping means cooperable to maintain a pair of metal workpieces in longitudinal alignment during machining of the facing ends to welding contours and during subsequent welding of the workpieces at the machined surfaces; a ram reciprocable transversely of the workpieces; indexing means on said ram engageable by the facing ends of the workpieces to position the same in predetermined spaced relation; oppositely facing machining means on said ram engageable with the facing ends of the workpieces; means operable to position said ram with said indexing means aligned with the workpieces for spatially relating the facing ends of the latter; means operable to position said ram with said machining means aligned with the workpieces; mechanism operable to advance said movable clamping means toward said fixed clamping means to engage the end of one workpiece with said machining means; cooperating means, fixed relatively to fixed clamping means, said movable clamping means and said machining head, operable upon such advance of said movable clamping means, to engage said machining means with the end of the other workpiece; said cooperating means advancing said machining head toward said fixed clamping means at one-half the rate of advance of said movable clamping means to maintain said head centered between said clamping means; said ram positioning means being operative reversely to withdraw said ram from between such facing ends to provide for juxtaposition of the latter for welding; and means operable by said ram, in the withdrawn position, to condition said clamping means for movement toward each other to abut the facing ends of the workpieces.

4. In butt welding apparatus, a fixed clamping means and a movable clamping means cooperable to maintain a pair of metal workpieces in longitudinal alignment during machining of the facing ends to welding contours and during subsequent welding of the workpieces at the machined surfaces; a machining head; means operable to position said head between the facing ends of the workpieces; mechanism operable to advance said movable clamping means toward said fixed clamping means to engage the end of one workpiece with said machining head; cooperating means, fixed relatively to fixed clamping means, said movable clamping means and said machining head, operable upon such advance of said movable clamping means to engage said machining head with the end of the other workpiece; said cooperating means maintaining said head centered between said clamping means; control means operable automatically to interrupt the advance of said movable clamping means after the same has advanced a predetermined amount toward said fixed clamping means; said head positioning means being operative reversely to withdraw said machining head from between such facing ends to provide for juxtaposition of the latter for welding; and means operable by said machining head, in the withdrawn position, to condition said clamping means for movement toward each other to abut the facing ends of the workpieces.

5. In butt welding apparatus, a fixed clamping means and a movable clamping means cooperable to maintain a pair of metal workpieces in longitudinal alignment during machining of the facing ends to welding contours and during subsequent welding of the workpieces at the machined surfaces; a ram reciprocable transversely of the workpieces; indexing means on said ram engageable by the facing ends of the workpieces to position the same in predetermined spaced relation; oppositely facing machining means on said ram engageable with the facing ends of the workpieces; means operable to position said ram with said indexing means aligned with the workpieces for spatially relating the facing ends of the latter; means operable to position said ram with said machining means aligned with the workpieces; mechanism operable to advance said movable clamping means toward said fixed clamping means to engage the end of one workpiece with said machining means; cooperating means, fixed relatively to fixed clamping means, said movable clamping means and said machining head, operable upon such advance of said movable clamping means to engage said machining means with the end of the other workpiece; said cooperating means advancing said machining head toward said fixed clamping means at one-half the rate of advance of said movable clamping means to maintain said head centered between said clamping means; control means operable automatically to interrupt the advance of said movable clamping means after the same had advanced a predetermined amount toward said fixed clamping means; said ram positioning means being operative reversely to withdraw said ram from between such facing ends to provide for juxtaposition of the latter for welding; and means operable by said ram, in the withdrawn position, to condition said clamping means for movement toward each other to abut the facing ends of the workpieces.

6. In a butt welding apparatus, a fixed clamping means and a movable clamping means cooperable to maintain a pair of metal workpieces in longitudinal alignment during machining of the facing ends to welding contours and during subsequent welding of the workpieces at the machined surfaces; a ram reciprocable transversely of the workpieces; indexing means on said ram engageable by the facing ends of the workpieces to position the same in predetermined spaced relation; oppositely facing machining means on said ram engageable with the facing ends of the workpieces; means operable to position said ram with said indexing means aligned with the workpieces for spatially relating the facing ends of the latter; means operable to position said ram with said machining means aligned with the workpieces; mechanism operable to advance said movable clamping means toward said fixed clamping means to engage the end of one workpiece with said machining means; cooperating means, fixed relatively to fixed clamping means said movable clamping means and said machining head, operable upon such advance of said movable clamping means to engage said machining means with the end of the other workpiece; said cooperating means advancing said machining head toward said fixed clamping means at one-half the rate of advance of said movable clamping means to maintain said head centered between said clamping means; control means operable automatically to interrupt the advance of said movable clamping means after the same has advanced a predetermined amount toward said fixed clamping means and to condition said mechanism to retract said movable clamping means; means operable, responsive to retraction of said movable clamping means, to withdraw said ram from between the workpieces to provide for juxtaposition of the facing ends of the latter for welding; and means operable by said ram, in the withdrawn position, to condition said clamping means for movement toward each other to abut the facing ends of the workpieces.

7. Butt welding apparatus comprising, in combination means operable to maintain a pair of metal workpieces in longitudinal alignment; control means; mechanism operative, responsive to actuation of said control means, to abut the facing ends of the workpieces under a relatively low pressure; timing means operative, responsive to actuation of said control means, to effect a flow of welding current across such facing ends for a first predetermined time interval; said timing means being operative, at the end of such predetermined time interval, to maintain said mechanism operative to hold such facing ends engaged under pressure for a further predetermined time interval; and means operative, at the end of such first time interval and responsive to such operation of said timing means, to control said mechanism to apply a relatively high abutting pressure to such facing ends; said timing means, during the application of such relatively high pressure, being operative to effect a flow of welding current across such facing ends for a second predetermined time interval, and being operative, at the end of such second predetermined time interval, to maintain said mechanism operative to hold such facing ends engaged under pressure for a further predetermined time interval.

8. Butt welding apparatus comprising in combination first and second pairs of welding dies, each pair operative to embrace one of the workpieces adjacent its end facing the end of the other workpiece, the dies of each pair being relatively movable transversely of the workpieces to engage and disengage the workpieces; first and second pairs of clamping jaws each arranged to grip a workpiece outwardly from one of said pairs of welding dies, the jaws of each pair being relatively movable transversely of the workpieces to engage and disengage the workpieces; means operable to activate said welding dies to embrace the workpieces; and means automatically operative, responsive to movement of said welding dies into such embracing relation, to activate said clamping jaws to grip the workpieces.

9. Resistance welding apparatus comprising a welding die arranged to have surface engagement with a metal workpiece over a predetermined area thereof, said die comprising a series of electrically conductive laminations extending substantially perpendicularly to the workpiece and clamped in surface juxtaposition to form a substantially solid member, the juxtaposed surfaces being electrically insulated from each other; said laminations effecting a substantially uniform distribution of the welding current throughout the work contacting area of the die.

10. In butt welding apparatus, fixed and movable workpiece engaging means cooperable to maintain a pair of metal workpieces in longitudinal alignment during machining of the facing ends to welding contours and during subsequent welding of the workpieces at the machined surfaces; a machining head; means operable to position said head between the facing ends of the workpieces; mechanism operable to advance said movable means toward said fixed means to engage the end of one workpiece with said machining head; cooperating means, fixed relatively to said fixed means, said movable means and said machining head, operable upon such advance of said movable means to engage said machining head with the end of the other workpiece; said cooperating means maintaining said head centered between said fixed and movable means; said head positioning means being operative reversely to withdraw said machining head from between such facing ends to provide for juxtaposition of the latter for welding a second mechanism operable on said movable means, when said head is retracted, to abut the facing ends of the workpieces under a relatively low pressure during an initial flow of welding current across such facing ends; and a third mechanism operable on said movable means to apply a relatively high pressure to said faces during a final flow of welding current thereacross; the engagement of the facing ends of the workpiece with said machining head determining the initial spacing of such facing ends to preset the limit of operation of said second mechanism, during the initial welding current flow, to obtain a preselected upset of the weld.

11. In butt welding apparatus, fixed and movable workpiece engaging means cooperable to maintain a pair of metal workpieces in longitudinal alignment during machining of the facing ends to welding contours and during subsequent welding of the workpieces at the machined surfaces; a machining head; means operable to position said head between the facing ends of the workpieces; mechanism operable to advance said movable means toward said fixed means to engage the end of one workpiece with said machining head; cooperating means, fixed relatively to fixed means, said movable means and said machining head, operable upon such advance of said movable means, to engage said machining head with the end of the other workpiece; said cooperating means maintaining said head centered between said fixed and movable means; said head positioning means being operative reversely to withdraw said machining head from between such facing ends to provide for juxtaposition of the latter for welding a second mechanism operable on said movable means, when said head is retracted, to abut the facing ends of the workpieces under a relatively low pressure during an initial flow of welding current across such facing ends; and a third mechanism operable on said movable means to apply a relatively high pressure to said faces during a final flow of welding current thereacross; said third mechanism acting through said second mechanism; the engagement of the facing ends of the workpiece with said machining head determining the initial spacing of such facing ends to preset the limit of operation of said second mechanism, during the initial welding current flow, to obtain a preselected upset of the weld.

12. Butt welding apparatus comprising in combination means operable to maintain a pair of metal workpieces in longitudinal alignment; control means; mechanism operative, responsive to actuation of said control means, to abut the facing ends of the workpieces under a relatively low pressure; other mechanism operative to apply a relatively high abutting pressure to such facing ends; interlock means normally operative, upon actuation of said control means, to render said other mechanism inoperative; and timing means operative, responsive to actuation of said control means, to effect a flow of welding current across such facing ends for a predetermined time interval; said timing means being operative, at the end of such predetermined time interval, to maintain said mechanism operative to hold such facing ends engaged under pressure for a further predetermined time interval, and to release said interlock means to render operative said other mechanism; said timing means, during the application of such relatively high pressure, being operative to effect a flow of welding current across such facing ends for a second predetermined time interval, and being operative, at the end of such second predetermined time interval, to maintain said other mechanism operative to hold such facing ends engaged under pressure for a further predetermined time interval.

13. In butt welding apparatus, a fixed clamping means and a movable clamping means cooperable to maintain a pair of metal workpieces in longitudinal alignment; a control effective to engage said clamping means with the workpieces at equal predetermined distances from the facing ends thereof; mechanism operable to advance said movable clamping means toward said fixed clamping means to abut such facing ends under pressure; a weld control operable to activate said mechanism and to effect a flow of welding current across the facing ends through said clamping means; an anneal control including operators effective, when said anneal control is actuated, to first release said fixed clamping means, then to retract said movable clamping means and the engaged workpieces a predetermined amount, and then to reengage said fixed clamping means with a workpiece; the operators of said anneal control thereupon releasing said movable clamping means, retracting the same said predetermined amount, and then reengaging said movable clamping means with a workpiece; said anneal control including circuit control means operable, responsive to completion of such positioning movements, to effect a flow of electric current through said clamping means, across the welded joint and through the workpiece sections between the clamping means and the welded joint.

14. In an electrical resistance pressure butt welding apparatus having a predetermined kv.-a. rating and including two sets of workpiece engaging welding dies relatively movable toward each other as the facing ends of the workpieces are abutted under pressure during a flow of welding current thereacross, a pair of welding transformers each having substantially one-half such predetermined kv.-a. rating; each transformer being fixed relative to one set of dies and having its secondary winding terminals aligned with and immediately adjacent the dies of such set; short conductors connecting one terminal of each secondary winding to the dies of one set; and short conductors connecting such one terminal of each transformer to the other terminal of the other transformer.

15. Electric resistance tube welding apparatus comprising, in combination, a frame having an elongated horizontal base, a pair of longitudinally extending, transversely spaced vertical plates secured to said base, and an elongated horizontal supporting plate secured to the upper ends of said vertical plates; said supporting plate having an opening intermediate its ends and between said vertical plates; a first pair of tube engaging welding dies longitudinally fixed on said supporting plate adjacent such opening; a carriage movably mounted on said supporting plate for longitudinal movement therealong relative to said first pair of dies; a second pair of tube engaging welding dies mounted on said carriage at the end thereof nearest said opening; a first welding transformer mounted on said frame directly beneath said first welding dies; a carrier suppended from said carriage directly beneath said second welding dies; a second welding transformer mounted on said carrier; each of said transformers having the terminals of its secondary winding vertically aligned with a set of welding dies; conductors connecting one secondary terminal of said first transformer to said first welding dies and to one secondary terminal of said second transformer; and other conductors connecting the other secondary terminal of said second transformer to said second welding dies and to the other secondary terminal of said first transformer; whereby the secondary windings of said transformers are connected in parallel to said welding dies.

OTIS R. CARPENTER.
GEORGE J. HARTNETT, JR.
REIDAR P. C. RASMUSEN.

REFERENCES CITED

The following references are of record in the file of this patent:

UNITED STATES PATENTS

| Number | Name | Date |
|---|---|---|
| 1,424,755 | Cullen et al. | Aug. 8, 1922 |
| 1,802,817 | Holmes | Apr. 28, 1931 |
| 1,902,955 | Holmes | Mar. 28, 1933 |
| 2,276,354 | Trainer | Mar. 17, 1942 |

FOREIGN PATENTS

| Number | Country | Date |
|---|---|---|
| 298,705 | Germany | June 22, 1917 |